United States Patent

[11] 3,571,516

[72] Inventors Chishio Ohyama; Kotaro Kato, Tokyo-to, Japan

[21] Appl. No. 843,513
[22] Filed July 22, 1969
[45] Patented Mar. 16, 1971
[73] Assignee Nippon Electric Company, Limited Tokyo-to, Japan
[32] Priority July 22, 1968
[33] Japan
[31] 43/51742

[54] DEMULTIPLEXING APPARATUS
9 Claims, 5 Drawing Figs.

[52] U.S. Cl. .......... 179/15
[51] Int. Cl. .......... H04j 3/06
[50] Field of Search .......... 179/15 (SYNC), 15 (ATI)

[56] References Cited

UNITED STATES PATENTS

| | | | |
|---|---|---|---|
| 2,692,916 | 10/1954 | Sterning | 179/15(SYNC) |
| 3,236,951 | 2/1966 | Yamamoto et al. | 179/15(ATI) |
| 3,426,153 | 2/1969 | Kitsopoulos | 179/15(SYNC) |
| 3,458,659 | 7/1969 | Sterning | 179/15(ATI) |

*Primary Examiner*—Kathleen H. Claffy
*Assistant Examiner*—David L. Stewart
*Attorney*—Marn & Jangarathis

ABSTRACT: Demultiplexing apparatus is provided in accordance with the teachings of the present invention wherein a high-speed pulse train comprising a plurality of low-speed pulse trains, which each include a frame-synchronizing signal therein, is received and each of said low-speed pulse trains is demultiplexed from said high-speed pulse train without relation to its time assignment within said high-speed pulse train. The time positions of said plurality of low-speed pulse trains within said high-speed pulse train being determined by the detection of the relative time difference between each of the corresponding frame-synchronizing signals present in the low-speed pulse trains.

Figures 1A, 1B, 1C, 1D:
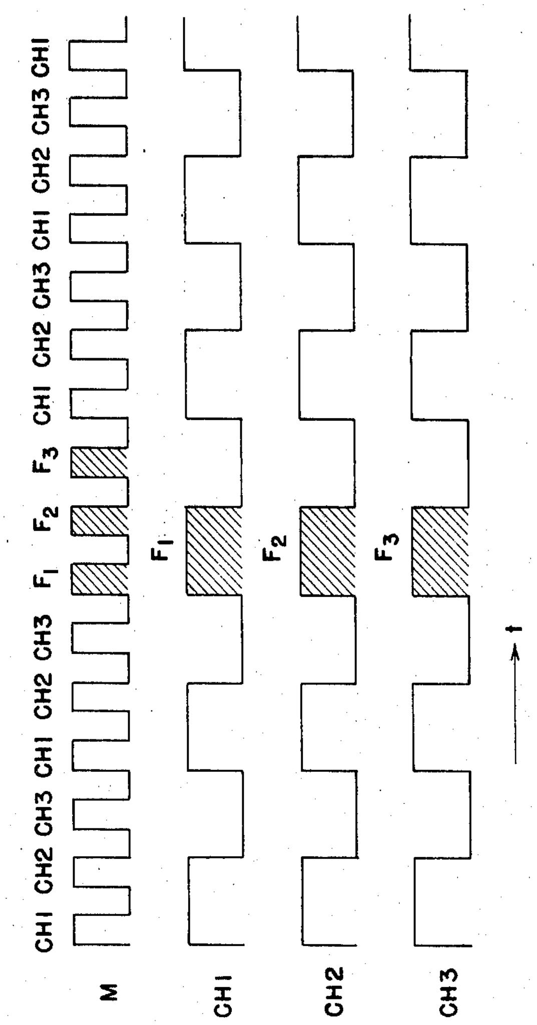

INVENTORS
Chishio Ohyama
Kotaro Kato
BY
Marn & Jangarathis
ATTORNEYS

Patented March 16, 1971 3,571,516

2 Sheets-Sheet 2

INVENTORS
Chishio Ohyama
Kotaro Kato
BY
Marn & Jangarathis
ATTORNEYS

DEMULTIPLEXING APPARATUS

This invention relates to PCM communications systems and more particularly to demultiplexing apparatus for use in time division multiplex PCM communications systems.

In conventional time division multiplex PCM communications systems, each frame to be transmitted comprises a pulse train which includes at least one code group for each of the multiplexed channels present therein and a frame synchronizing signal inserted into the pulse train during the multiplexing operation. Each of the code groups present in each of the frames to be transmitted is representative of the instantaneous magnitude of the signal in a respective one of the multiplexed channels while the frame-synchronizing signal present therein designates a corresponding location in each frame so that receiving equipment present in such conventional time division multiplex PCM communications systems may be synchronized with the transmitting equipment utilized therein. Framing or the synchronization of the receiving equipment with the transmitting equipment in such conventional time division multiplex PCM communications systems is then normally accomplished in the receiving equipment by a frame-synchronizing loop, provided therein, which acts in the well-known manner to search out, during the demultiplexing operation, the position of the frame-synchronizing signal present in each of the transmitted frame pulse trains, so that each of the code groups present in each frame may be appropriately distributed to the channel associated therewith.

The various successful modes of detection of the frame-synchronizing signal employed by such time division multiplex PCM communications systems should theoretically be applicable regardless of the bit rate employed; however, due to practical limitations in the speed of the logic circuits utilized in said frame-synchronizing loop, artificial speed limitations are often imposed on the operation of relatively high-speed time division multiplex PCM communications systems. Thus, for instance, in so called ultra-high-speed time division multiplex PCM communications systems employing superwide band transmission media, such as millimeter wave, laser or the like; it is often highly difficult to obtain logic circuits which allow the time division multiplex PCM transmission of the several hundred mega bits per second to the several thousand mega bits per second obtainable therewith.

Therefore, it is a principal object of this invention to provide demultiplexing apparatus for use in time division multiplex PCM communications systems which demultiplexing apparatus is capable of operating upon information transmitted at high bit rates without imposing substantial hardware speed limitations on the overall time division multiplex PCM system associated therewith. Other objects and advantages of this invention will become clear from the following detailed description of an embodiment thereof, and the novel features will be particularly pointed out in conjunction with the appended claims.

Figure 2:
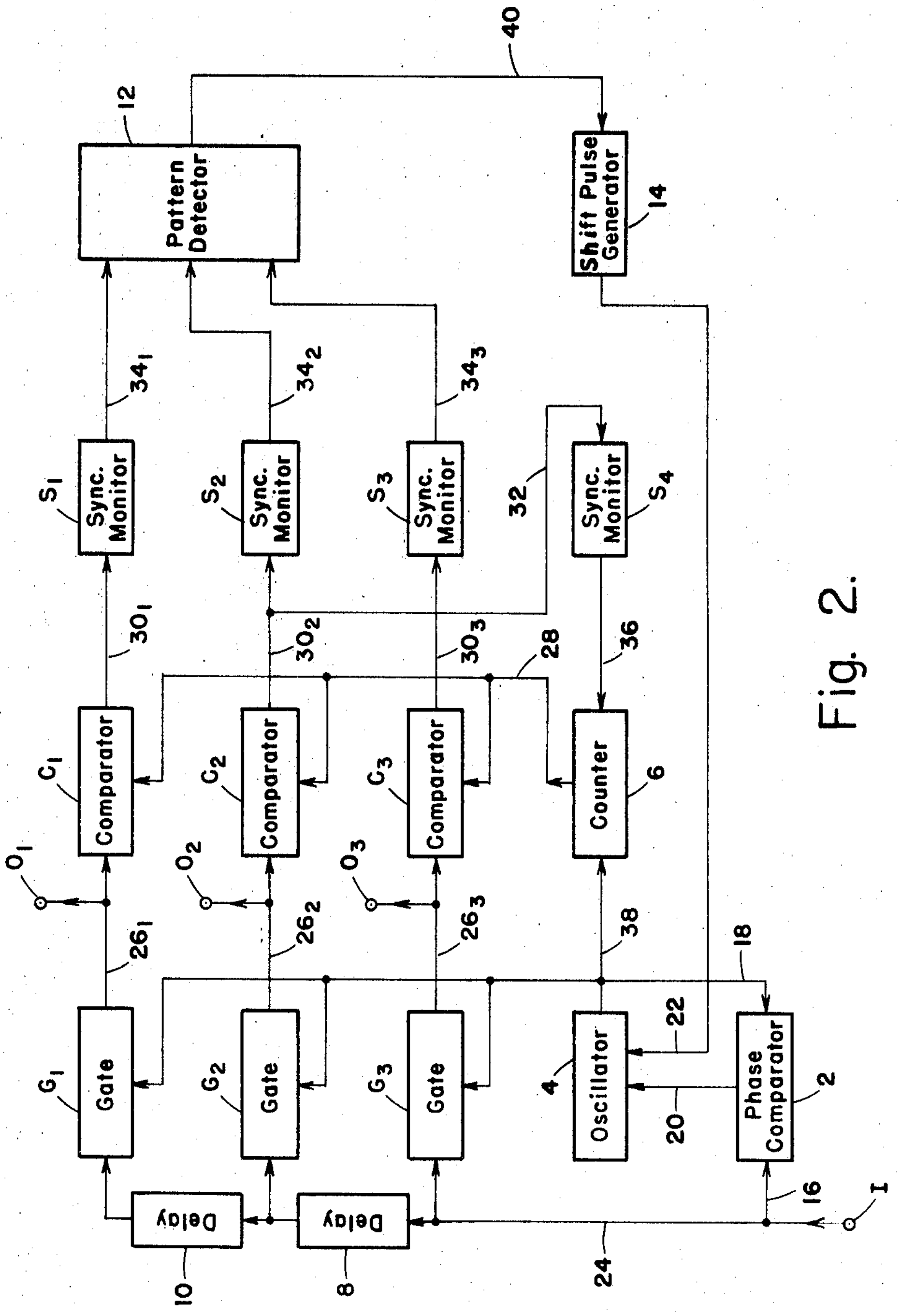

In accordance with this invention, demultiplexing apparatus for use in time division multiplex PCM communications systems is provided wherein a high-speed pulse train comprising a plurality of multiplexed low-speed pulse trains, each of which includes a frame synchronizing signal therein and is appropriately suited for logic operations, is received and each of said low speed pulse trains is demultiplexed from said high-speed pulse train without relation to its time assignment within said high-speed pulse train; the time positions of said plurality of low-speed pulse trains in said high-speed pulse train being determined by the detection of the relative time differences between each of the frame-synchronizing signals included in said plurality of low-speed pulse trains. The invention will be more clearly understood by reference to the following detailed description of an exemplary embodiment thereof in conjunction with the accompanying drawings in which:

FIGS. 1A—1D graphically represent the waveform of the high-speed pulse train transmitted to and received by the demultiplexing apparatus according to the present invention as well as the low speed pulse train components thereof; and FIG. 2 a block diagram which schematically illustrates an embodiment of the demultiplexing apparatus according to the present invention.

Referring now to the drawings and more particularly to FIGS. 1A—1D thereof, there is shown a timing chart which graphically represents the waveform of the high-speed pulse train transmitted to and received by the demultiplexing apparatus according to the present invention as well as the low-speed pulse train components thereof. The high-speed pulse train M transmitted to and received by the demultiplexing apparatus according to the present invention is illustrated in FIG. 1A and comprises a high-speed pulse train M whose bit rate is suitable for transmission in the so called ultra-high-speed time division multiplex PCM communications systems employing superwide band transmission media such as millimeter wave, laser or the like. The high-speed pulse train M, as shown in FIG. 1A, takes the waveform of $n$ multiplexed low-speed pulse trains $CH_1$–$CH_3$ wherein for the illustrative purposes of this disclosure $n$ has been selected at a value of three. The low speed pulse train components $CH_1$–$CH_3$ which have been multiplexed to form the high-speed pulse train M are illustrated in FIGS. 1B—1D, respectively. The low speed pulse trains $CH_1$–$CH_3$ shown in FIGS. 1B—1D each include frame-synchronizing signals indicated by the hatched pulses $F_1-F_3$, respectively, and have a frequency which is one-$n$th $(1/n)$ of that of the high-speed pulse train M or in the case illustrated in FIGS. 1A—1D, one-third of that of the high-speed pulse train M. The low-speed pulse trains $CH_1$–$CH_3$ are selected to have a speed which is sufficiently low for conventional logic circuitry to act with propriety thereon and hence may be readily decoded and framed in a conventional frame synchronizing loop. The low speed pulse trains $CH_1$–$CH_3$ may be multiplexed in a bit by bit manner, into the high-speed pulse train M in any conventional manner so that the speed of the high-speed pulse train M is $n$ times the speed of low speed pulse train components $n$. As the low speed pulse trains $CH_1-CH_3$ are here multiplex in a bit by bit manner to form the high-speed pulse train M, the frame-synchronizing signals $F_1-F_3$ present therein will be arranged successively, as shown in FIG. 1A, in three time slots of the high-speed pulse train M formed. The manner in which the multiplexing is here accomplished forms no part of the present invention and hence may be considered as achieved by any conventional means; however, it should be realized that any number $n$ of low-speed pulse trains may be relied upon, and that in general, the high-speed pulse train M will have a speed of $n$ times the speed of the number of low-speed pulse trains $n$ relied upon. Accordingly, it will be appreciated by those of ordinary skill in the art, that the high-speed pulse train M illustrated in FIG. 1A is transmitted to and received by the demultiplexing apparatus according to the present invention and that said high-speed pulse train M is formed by the bit by bit multiplexing of a plurality of low-speed pulse trains each containing a frame-synchronizing signal therein.

Referring now to FIG. 2, there is shown a block diagram schematically illustrating an embodiment of the demultiplexing apparatus according to the present invention. As shown in FIG. 2, the demultiplexing apparatus according to the present invention comprises phase comparator means 2, voltage controlled oscillator means 4, counter means 6, channel gate means $G_1$—$G_3$, first and second delay means 8 and 10, channel comparator means $C_1$—$C_3$, synchronization monitor means $S_1-S_4$, pattern detector means 12 and shift pulse generator means 14. The phase comparator means 2 may take egorm of a conventional phase comparator device which acts in the well-known manner to compare the phases of two waveforms applied to first and second inputs thereto and provide an output voltage representative of the phase differential between such first and second inputs. A first input to the phase comparator means 2 is connected to the input terminal means 1 of the embodiment of the demultiplexing apparatus according to the present invention through the conductor 16 while the second input of the phase comparator means 2 is connected to the output of the voltage controlled oscillator means 4 through the conductor 18. The first input to the phase comparator means 2 thus receives as an input thereto the high-speed pulse train M, as illustrated in FIG. 1A, which is received by the demultiplexing apparatus according to the present invention while the second input thereto is in receipt of the output of the voltage controlled oscillator means 4, which, as shall be seen hereinafter, has a repetition frequency in the embodiment of the invention illustrated in FIG. 2 equal to one-third of high-speed pulse train M applied to the input terminal means 1. The output of the phase comparator means 2 is applied through the conductor 20 to a first input of the voltage controlled oscillator means 4. The voltage-controlled oscillator means 4 may take any of the well known forms of clock pulse generator means capable of generating a periodic clock pulse at a fixed repetition frequency and having a phase which is responsive to voltage signal applied thereto. The voltage-controlled oscillator means 4 in the embodiment of the invention illustrated in FIG. 2 acts to generate clock pulses whose fixed repetition frequency is equal to one third of the repetition frequency of the high-speed pulse train M applied to input terminal means 1 and equal to the repetition frequency of each of the low speed pulse trains $CH_1$–$CH_3$ shown in FIGS. 1B—1D. A first input to the voltage-controlled oscillator means 4, as applied through conductor 20, acts to synchronize the periodic clock pulses produced by said voltage controlled oscillator means 4 with any one of the three repetitive multiplexed pulses $CH_1$–$CH_3$ present in the high-speed pulse train M while a second input to the voltage-controlled oscillator means 4, applied over conductor 22 in a manner to be described below, acts to control the phase of the clock pulses produced by said voltage-controlled oscillator means 4 so that such clock pulses as are produced thereby will be synchronized with a particular one of the three repetitive multiplexed pulses $CH_1$–$CH_3$ present in the high-speed pulse train M. The output of the voltage-controlled oscillator means 4 is applied to conductor 18 which is commonly connected to the second input of the phase comparator means 2, as was stated above, and the second or enabling inputs to each of the channel gate means $G_1$—$G_3$.

The input terminal means I which as stated above acts as the input terminal to the embodiment of the invention illustrated in FIG. 2 is also connected through the conductor 24 to a first input of the channel gate means $G_3$, to a first input of the channel gate means $G_2$ through the first delay means 8, and to a first input of the channel gate means $G_1$ through the second delay means 10. The first and second delay means 8 and 10 may take the form of conventional delay line means capable of inserting a one bit delay into information conveyed therethrough. Therefore, as said first and second delay means 8 and 10 are connected in series with the first input to the channel gate means $G_3$ connected before each of said first and second delay means 8 and 10, the first input to the channel gate means $G_2$ connected therebetween and the first input to the channel gate means $G_1$ connected thereafter; it will be appreciated that any group of three successive pulses such as CH1–$CH_3$ shown in FIG. 1A, having a one bit spacing therebetween, will be simultaneously applied to the first inputs of the channel gate means $G_1$—$G_3$ respectively.

The channel gate means G1—$G_3$ may take any of the well-known forms of demultiplexing gate means commonly employed by those of ordinary skill in the art to selectively pass to the outputs thereof, channel pulses applied to the first inputs thereto upon the application of an enabling pulse to the second or enabling inputs thereto. As will be recalled, the second or enabling input to each of the channel gate means G1—$G_3$ is connected to the output of the voltage-controlled oscillator means 4 through conductor 18 and hence each of the channel gate means $G_1$—$G_3$ is adapted to be enabled by the clock pulses produced thereby. The outputs of the channel gate means $G_1$—$G_3$ are coupled through conductors $26_1$—$26_3$, respectively, to the channel outputs $O_1$—$O_3$ and the channel comparator means $C_1$—$C_3$, respectively, associated with the channels 1—3 in which they reside. If the low-speed pulse trains $CH_1$–$CH_3$ shown in FIG. 1B—1D comprise conventional time division multiplex PCM frames of information of the variety described in the introduction to this specification, the channel outputs $O_1$—$O_3$ may connect respectively to conventional demultiplexing circuitry, not shown herein, in the form of decoders and gates; however, if such low-speed pulse trains $CH_1$–$CH_3$ comprise separate channel information, separate channel conductors may be connected to each of the channel outputs $O_1$—$O_3$.

The channel comparator means $C_1$—$C_3$ present in each channel formed by the channel gate means $G_1$—$G_3$, respectively, may take the form of conventional comparator devices which act in the well known manner to compare first and second input signals applied thereto and generate an output pulse in response to a condition wherein said first and second input signals are the same. A first input is supplied to the channel comparator means $C_1$—$C_3$ from the outputs of the channel gate means $G_1$—$G_3$ through conductors $26_1$—$26_3$, respectively, while a second input is commonly applied to each of said channel comparator means $C_1$—$C_3$ by conductor 28. The output of each of the channel comparator means $C_1$—$C_3$ is connected through the channel conductors $30_1$—$30_3$, respectively, to the inputs of channel synchronization monitor means $S_1$—$S_3$, respectively; and, in addition thereto, the output of the channel comparator means $C_2$ is connected through the conductors $30_2$ and 32 to the input of the synchronization monitor means $S_4$. The synchronization monitor means $S_1$—$S_4$ may each take the form of conventional circuit means which act in the well-known manner to monitor the outputs of the channel comparator means $C_1$—$C_3$ connected thereto and in response to the detection of a predetermined output therefrom produce a particular output signal. In the case of the channel synchronization monitor means $S_1$—$S_3$, each of said channel synchronization monitor means $S_1$—$S_3$ will respond to the detection of a pulse output from the channel comparator means $C_1$—$C_3$ respectively, to produce a digital "1" output pulse and in response to the absence of a pulse output from said channel comparator means $C_1$—$C_3$ each of said channel synchronization monitor means will produce a digital "0" output. Conversely, the synchronization monitor means $S_4$ will respond to the absence of a predetermined pulse output from the channel comparator means $C_2$ to produce a shift pulse, whose purpose will be rendered apparent below, at the output thereof while upon the detection of a predetermined pulse output from the channel comparator means $C_2$, no output will be produced by said synchronization monitor means $S_4$. The output of each of the channel synchronization monitor means $S_1$—$S_3$ is connected over channel conductors $34_1$—$34_3$, respectively, to separate inputs of the pattern detector means 12; while the output of the synchronization monitor means $S_4$ is connected by the conductor 36 to a second input of the counter means 6.

The counter means 6 may take the form of a conventional counter circuit which acts in the well-known manner to accept a plurality of input pulses applied thereto at a first input and in response to the receipt of a select number of such input pulses produce an output indicative of the receipt of such select number of input pulses. The counter means 6 is designed to have a count cycle equal to the period of the synchronizing signals $F_1$—$F_3$ present in the low speed pulse trains $CH_1$–$CH_3$, respectively, as illustrated in FIGS. 1B—1D; and hence the counter means 6 is designed to count the same number of pulses as are in each frame of one of the low speed pulse trains $CH_1$–$CH_3$. A first input to the counter means 6 is connected through conductor 38 to the voltage-controlled oscillator means 4 which supplies thereto clock pulses to be counted at the same repetition rate as the low-speed pulse trains $CH_1$–$CH_3$ or at one-third the repetition rate of the high-speed pulse train M, shown in FIG. 1A. A second input to the counter means 6 is coupled through the conductor 36, as aforesaid, to the output of the synchronizing monitor means $S_4$) The second input to the counter means 6 is a shift input which acts in the well known manner to change the state of the count therein. The output of the counter means 6 is connected to conductor 28 and hence coupled in common, as stated above, to each of the second inputs of the channel comparator means $C_1$—$C_3$. The counter means 6, as shall be seen below, is relied upon in the embodiment of the demultiplexing apparatus illustrated in FIG. 2 to generate a frame-synchronizing pattern which is utilized to establish from synchronization so that the low-speed pulse trains $CH_1$–$CH_3$ demultiplexed from the high speed pulse train M may be distributed to the appropriate channels therefor.

The pattern detector means 12, as was stated above is connected at the three separate inputs thereto to the outputs of the channel synchronization monitor means $S_1$—$S_3$ through the channel conductors $34_1$—3, respectively, and accordingly receives either a 1 or a 0 input at each of said three separate inputs. The pattern detector means 12 may, in the case of the instant embodiment of this invention, wherein *n* has been selected at three, comprise any form of pattern recognition apparatus capable of distinguishing between the binary input combinations of 111, 110, 011 and treating any other three bit binary number as if it were a 111 combination so that, in actuality, the pattern detector means 12 recognizes only the input combinations of 110 or 011 and produces an output pulse indicative of the binary input combination recognized. The output of the pattern detector means 12 is applied through the conductor 40 to the input of the shift pulse generator means 14. The shift pulse generator means 14 may take any conventional form of circuit which produces at the output thereof a first shift pulse in response to one of the output pulses provided by the pattern detector means 12 and a second shift pulse in response to the other of the output pulses provided by said pattern detector means 12. The output of the shift pulse generator means 14 is applied to the second input of the voltage-controlled oscillator means 4 through the conductor 22 and as will be seen below, the first shift pulses provided by said shift pulse generator means 14 will cause a $2\pi/3$ shift in the phase of the output of the voltage-controlled oscillator means 4 while the second shift pulse provided by the shift pulse generator means 14 will cause a $-2\pi/3$ shift in the phase of the output of the voltage-controlled oscillator means 4.

In the operation of the embodiment of the demultiplexing apparatus according to the present invention as illustrated in FIG. 2, the high speed pulse train M, shown in FIG. 1A, which comprises the low-speed pulse trains $CH_1$–$CH_3$ shown in FIGS. 1B—1D, respectively; is applied to input terminal means I and coupled therefrom through conductor 16 to a first input of the phase comparator means 2. The voltage-controlled oscillator means 4, connected to the output of the phase comparator means 2, acts in the previously described manner to regenerate clock pulses at a frequency equal to one-third of the pulse repetition frequency of the high-speed pulse train M and equal to the pulse repetition frequency of the low-speed pulse trains $CH_1$–$CH_3$ which were multiplexed to form said high-speed pulse train M. The output of the voltage-controlled oscillator means 4 is applied through conductor 18 to the second input of the phase comparator means 2 whereby said phase comparator means 2 is in receipt of the high-speed pulse train M at a first input thereto and clock pulses having a repetition frequency equal to one-third of that of the high-speed pulse train M at the second input thereto. The phase comparator means 2 acts in the well known manner to compare the phases of each of the first and second inputs applied thereto and in response to such comparison produce an output signal representative of the phase difference therebetween. As the output of the phase comparator means 2 is applied to the first input of the voltage-controlled oscillator means 4 and is a phase comparison of pulses having a three to one repetition rate ratio, the voltage-controlled oscillator means 4 will respond thereto in the well-known manner to adjust the phase of the clock pulses produced thereby so that such clock pulses will be in phase with one of each group of three pulses present in the high-speed pulse train M. Thus, when the output of the phase comparator means 2 is indicative that phase synchronization has been established between the first and second inputs thereto, the voltage-controlled oscillator means 4 will be regenerating clock pulses having one of three possible phases, i.e., those in phase synchronism with the pulses in the high-speed pulse train M indicated $CH_1$ and $F_1$, those in phase synchronism with the pulses in the high-speed pulse train M indicated $CH_2$ and $F_2$ or those in phase synchronism with the pulses in the high-speed pulse train M indicated $CH_3$ and $F_3$. The clock pulses regenerated by the voltage-controlled oscillator means 4 thus having repetition rate equal to one-third of the repetition frequency of the high-speed pulse train M and of one of the three possible stable states of phase described above, are applied from the output of said voltage-controlled oscillator means 4 through the conductor 18 to the second or enabling inputs of the channel gates $G_1$—$G_3$, the second input of the phase comparator means 2 and through the conductor 38 to the first input of the counter means 6.

The high-speed pulse train M applied to the input terminal means I is also applied through conductor 24 to the first input of the channel gate means $G_3$, through the first delay means 8 to the first input of the channel gate means $G_2$ and through the first and second delay means 8 and 10 to the first input of the channel gate means $G_1$. As the first and second delay means 8 and 10 each act as previously described to insert a one bit delay into pulses being applied thereto, it will be appreciated that a give pulse in the high-speed pulse train M applied to the first input of the channel gate means $G_1$ will be received thereby two time slots after such pulse has been applied to the first input of the channel gate means $G_3$ and one time slot after such pulse has been applied to the first input of the channel gate means $G_2$. Furthermore, due to the relationship between the delay means 8 and 10 and the first inputs to the channel gate means $G_1$—$G_3$, if three pulses in the high-speed pulse train M occupying successive time slots are considered, it will be seen that the first of such pulses will be received at the first input to the channel gate means $G_1$ at the same instant of time as the second and third of such pulses are received at the first inputs to the channel gate means $G_2$ and $G_3$, respectively.

As the channel gate means $G_1$—$G_3$ each act, as previously described, to pass an input pulse applied to the first inputs thereto to the outputs thereof only when enabled by pulses applied to the second or enabling input thereof, the channel gate means $G_1$—$G_3$ act in combination with the first and second delay means 8 and 10 to form a distributor arrangement whereby each group of three pulses occupying successive time slots in the high-speed pulse train M may be demultiplexed and applied separately to the outputs of the channel gate means $G_1$—$G_3$, provided that suitably phased enabling pulses are simultaneously applied to the second or enabling inputs of the channel gate means $G_1$—$G_3$ at a repetition rate equal to one-third the frequency of the high speed pulse train M. The input pulses applied to the second or enabling inputs of the channel gate means $G_1$—$G_3$, as stated above, are applied thereto through the conductor 18 from the output of the voltage-controlled oscillator means 4 and thus take the form of clock pulses having a repetition rate equal to one-third the repetition frequency of the high-speed pulse train M. Therefore, once the voltage-controlled oscillator means 4 has been established in one of its three stable states of phase by the action of the phase comparator means 2, as aforesaid, the clock pulses applied as enabling pulses to the second or enabling inputs of the channel gate means G1—$G_3$ so that each group of three pulses present in successive time slots in the high-speed pulse train M will be distributed to one of the outputs of the channel gate means $G_1$—$G_3$ and hence to the output terminal means $0_1$—$O_3$, respectively, connected thereto. Accordingly, for the operation of the demultiplexing apparatus according to the present invention as thus far described, it will be seen that the outputs of the channel gate means $G_1$—$G_3$ may have any one of the three cyclic permutations of $CH_1$—$CH_3$ pulses present thereat, respectively, i.e., $CH_1$, $CH_2$ and $CH_3$; $CH_3$, $CH_1$ and $CH_2$; or $CH_2$, $CH_3$ and $CH_1$, depending upon which of the three stable states of phase the voltage-controlled oscillator means 4 is in.

It will be recalled from the discussion of FIGS. 1A—1D that the high-speed pulse train M was formed by the bit by bit multiplexing of the three low-speed pulse trains $CH_1$—$CH_3$, and therefore, to achieve the simultaneous distribution 1—$CH_i$ime related multiplexed pulses in the high-speed 1—d train M, it is desirable that the pulses $CH_1$—$CH_3$ be applied to the output terminal means $0_1$—$O_3$, respectively. This is accomplished in the demultiplexing apparatus according to the present invention without relation to their time assignment by making use of the relationship between the frame synchronizing signals $F_1$—$F_3$ present in the pattern shown in FIG. 1A in the high-speed pulse train M due to the bit by bit multiplexing of the low-speed pulse trains $CH_1$—$CH_3$.

The function of the counter means 6 is to generate a frame-synchronizing pattern so that the relationship between the frame-synchronizing signals present in the high-speed pulse train M, as demultiplexed into the separate pulses of the low-speed pulse trains $CH_1$—$CH_3$ by the channel gate means $G_1$—$G_3$, may be determined and appropriately modified so that a requisite relationship therebetween is obtained. As was stated above, the counter means 6 will generate a frame-synchronizing pattern each time the number of pulses applied to the input thereto is equal to the number of pulses present in any one of the frames of any one of the low-speed pulse trains $CH_1-CH_3$) Therefore, as the counter means 6 receives clock pulses to be counted from the voltage-controlled oscillator means 4 through the conductor 38 and since such clock pulses are at one-third the repetition frequency of the high-speed pulse train M and hence at the same repetition frequency as the pulses present at the output of the channel gate means $G_1$—$G_3$; the counter means 6 will produce a frame synchronizing pattern at the same repetition frequency as a frame-synchronizing signal $F_1$, $F_2$ or $F_3$ appears at the outputs of the channel gate means $G_1$—$G_3$. The output of the counter means 6 is applied in common through the conductor 28 to the second input of each of the channel comparator means $C_1$—$C_3$ while the outputs of the channel gate means $G_1$—$G_3$ are each connected to the first inputs of the channel comparator means $C_1-C_3$, respectively. The channel comparator means, $C_1-C_3$, as set forth above, will produce an output pulse whenever a frame-synchronizing signal applied to the first inputs thereof coincides in time with the frame-synchronizing pattern which is commonly applied to the second inputs thereof by the counter means 6. However, as the counter means 6 did not necessarily start the count at the same instant of time at which the high-speed pulse train M was applied to the input terminal means I, the frame-synchronizing pattern produced by the counter means 6 need not be applied to the second inputs of the channel comparator means $C_1$—$C_3$ at the same time as the frame-synchronizing signals $F_1$—$F_3$ are applied to the first inputs thereof. In order to achieve a synchronized relationship between the frame-synchronizing signals $F_1$—$F_3$ applied to the first inputs of the channel comparator means $C_1$—$C_3$, the output of the channel comparator means $C_2$ is connected through conductors $30_3$ and 32 to the input of the synchronization monitor means $S_4$. As was described above, the synchronization monitor means $S_4$ will respond to the absence of a predetermined pulse output from the channel comparator means $C_2$ to produce a shift pulse at the output thereof and respond to the detection of a predetermined pulse output from the channel comparator means $C_2$ by producing no output. Accordingly, the synchronization monitor means $S_4$ produces a shift pulse at the output thereof in response to an indication of an out of synchronization state by the channel comparator means $C_2$ while no shift pulse is produced thereby upon the indication of a synchronous relationship between the frame-synchronizing signals applied to the first input of the channel comparator means $C_2$ and the frame-synchronizing pattern applied to the second input thereof. The output of the synchronization monitor means $S_4$ is applied through the conductor 32 to the second or shift input of the counter means 6 so that the shift pulses which may be applied thereto by said synchronization monitor means $S_4$ in response to an indication of an out of synchronous state will act, in the well-known manner, to change the state of the count thereof and hence the time slot in which the frame-synchronizing pattern produced thereby will occur. This operation, which is often referred to as frame synchronization, is continued until the counter means 6 has been synchronized with the low-speed pulse train $CH_1$, $CH_2$ or $CH_3$ applied to the first input of the channel comparator means $C_2$ in a manner such that the frame-synchronizing pattern applied to the second input of said channel comparator means $C_2$ occupies the same time slot as the frame-synchronizing signal applied to the first input thereto. Thus, it will be seen that frame synchronization is established between the frame-synchronizing signals applied to the first input of the channel comparator means $C_2$ and the frame-synchronizing pattern applied to the second input thereof.

Upon the completion of the above-described frame synchronization operation, the requisite ones of the low-speed pulse trains $CH_1$—$CH_3$ applied respectively to the first inputs of the channel comparator means $C_1$—$C_3$ will be compared to the frame-synchronizing pattern applied in common to the second inputs thereof by the counter means 6. As frame synchronization has already been established, as aforesaid, between the frame synchronization signals applied to the first input of the channel comparator means $C_2$ and the frame synchronization pattern applied to the second input thereof, each such frame synchronization signal and frame synchronization pattern will occupy the same time slot and in response to this condition, the channel comparator means $C_2$ will produce an output pulse indicative thereof. However, since the low speed pulse train applied to the first input of the channel comparator means $C_2$ may comprise any one of the low-speed pulse trains $CH_1$—$CH_3$, depending as stated above upon which of the three possible states of stable oscillation phase the voltage-controlled oscillator means 4 is in; the frame-synchronizing signal applied to the first input of the channel comparator means $C_2$ may comprise any one of the frame-synchronizing signals $F_1$—$F_3$ illustrated in FIG. 1A. Therefore, as the frame-synchronizing signals $F_1$—$F_3$, shown in FIG. 1A, occupy three successive time slots in the high-speed pulse train M and the channel comparator means $C_1$ and $C_3$ operate in precisely the same manner as the channel comparator means $C_2$, if the $F_1$ synchronizing signal is applied to the channel comparator means $C_2$, pulses indicative of frame synchronization will be produced only by the channel comparator means $C_1$ and $C_2$ which receive the frame synchronization signals $F_1$ and $F_2$, respectively; if the $F_2$ synchronizing signal is applied to the channel comparator means $C_2$, pulses indicative of frame synchronization will be produced by all of the channel comparator means $C_1$—$C_3$; while if the $F_3$ synchronizing signal is applied to channel comparator means $C_2$ pulses indicative of frame synchronization will be produced only by the channel comparator means $C_1$ and $C_2$ which receive the frame synchronization signals $F_2$ and $F_3$, respectively. Thus, it will be seen that once frame synchronization has been established between the channel comparator means $C_2$ and the counter means 6, a pulse indicative of frame synchronization will be produced each time a frame synchronization signal is applied to the first input of said channel comparator means $C_2$ so long as frame synchronization is maintained; however, whether a pulse indicative of frame synchronization is produced by one or both of the channel comparator means $C_1$ and/or $C_3$ will be strictly dependent on the cyclic permutation of the low-speed pulse trains $CH_1$—$CH_3$ demultiplexed from the high-speed pulse train M and applied to the first inputs of the said channel comparator means $C_1$—$C_3$.

The outputs of each of the channel comparator means $C_1$—$C_3$ are connected to the channel synchronization monitor means $S_1$—$S_3$, respectively, through the channel conductors $30_1$—$30_3$. The channel synchronization monitor means $S_1-S_3$ act in the previously described manner to produce at the respective outputs thereof a digital 1 output pulse when a pulse indicative of frame synchronization is applied thereto and a 0 output when no such pulse is received thereby. Therefore, as the outputs of each of the channel synchronization means $S_1$—$S_3$ are coupled through channel conductors $34_1$—$34_3$, respectively, to individual inputs of the pattern detector means 12, the pattern detector means 12 will receive a 3-bit digital input pattern representative of the state of frame synchronization of each of channel comparator means $C_1$—$C_3$ wherein the bit input applied thereto from the channel synchronization monitor means $S_2$ is a 1 whenever a frame synchronization signal is applied to the first input of the channel comparator means $C_2$ after frame synchronization has been established therefor and bit inputs applied thereto from channel synchronization monitor means $S_1$ and $S_3$ will be strictly dependent upon the cyclic permutation of the low-speed pulse trains $CH_1$—$CH_3$ demultiplexed from the high-speed pulse train M and applied to the first inputs of said channel comparator means $C_1$—$C_3$.

As will be recalled, from above, in order to achieve the simultaneous distribution of the time related multiplexed pulses in the high-speed pulse train M, the low-speed pulse trains $CH_1-CH_3$ must be applied to the output terminal means $O_1$—$O_3$, respectively. This condition is indicated by the application of a 1-bit to the pattern detector means 12 from each of the channel synchronization monitor means $S_1$—$S_3$, which here acts as synchronization confirmation circuits, because only when the frame-synchronizing signals $F_1$—$F_3$ are applied to the first inputs of the channel comparator means $C_1$—$C_3$, respectively, after frame synchronization has been established, will this bit pattern be applied to the pattern detector means 12. Furthermore, the other two possible 3-bit patterns i.e., 110 or 011, which may be applied to the pattern detector means 12 after the counter means 6 has been synchronized will indicate which of the frame-synchronizing signals $F_1$—$F_3$ is being applied to the first input of the channel comparator means $C_2$ and hence the bit shift required in the cyclic permutation of the low-speed pulse trains $CH_1$—$CH_3$ presently being applied to first inputs of the channel comparator means $C_1$—$C_3$ to establish the desired condition wherein the low-speed pulse trains $CH_1$—$CH_3$ are applied to the first inputs of the channel comparator means $C_1$—$C_3$, respectively. Accordingly the 3-bit input pattern applied to the pattern detector means 12 by the channel synchronization monitor means $S_1$—$S_3$ reflects the relationship between the frame-synchronizing signals $F_1$—$F_3$ applied to the first inputs of the channel comparator means $C_1$—$C_3$, the cyclic permutation of the low-speed pulse trains $CH_1$—$CH_3$ available at the output terminal means $O_1$—$O_3$ and the number of bit shifts required to change the cyclic permutation of the low-speed pulse trains $CH_1-CH_3$ presently being applied to the output terminal means $O_1-O_3$ to the desired condition wherein the low speed pulse trains $CH_1-CH_3$ are applied to output terminal means $O_1-O_3$ respectively.

Chart I below indicates the various three bit patterns which may be applied to the pattern detector means 12 after frame synchronization has been established and the necessary number of bits shifts required in the cyclic permutation of the low-speed pulse trains causing said pattern to achieve a synchronized state wherein the 3-bit pattern comprises all 1's.

CHART I

| | Output | | |
|---|---|---|---|
| Cyclic Permutation | $S_1$ | $S_2$ | $S_3$ |
| No shift | 1 | 1 | 1 |
| One bit shift | 1 | 1 | 1 |
| Two bit shift | 0 | 1 | 1 |

As is indicated in Chart I, when a 111 bit pattern is applied to the pattern detector means 12 frame synchronization signals $F_1-F_3$ are applied to the first inputs of the channel comparator means $C_1-C_3$, respectively, and therefore no shift in the cyclic permutation of the low speed pulse trains $CH_1$—$CH_3$ is required as a synchronized state is already present. However, when a 110-bit pattern is applied to the pattern detector means 12, frame synchronizing signals $F_2$ and $F_3$ are applied to the first inputs of the channel comparator means $C_1$—$C_2$, respectively, while a $CH_1$ channel pulse is applied to the first input of the channel comparator means $C_3$ and therefore a one bit shift in the cyclic permutation of the low-speed pulse trains CH 1—$CH_3$ is required to achieve a synchronized state. Similarily, when a 011-bit pattern is applied to the pattern detector means 12, frame synchronizing signals $F_1$ and $F_2$ are applied to the first inputs of the channel comparator means $C_2$ and $C_3$, respectively, while a $CH_3$ channel pulse is applied to the first input of the channel comparator means $C_1$; therefore, a two bit shift in the cyclic permutation of the low speed pulse trains $CH_1$—$CH_3$ is required to achieve a synchronized state. Thus, it will be seen that only in the case of an all 1-bit pattern applied to the pattern detector means 12 will the demultiplexing apparatus depicted in FIG. 2 achieve a synchronized state; while the other possible three bit patterns indicate the relationship between the frame synchronizing signals and thus the nature of the correction required to achieve a synchronized state.

As stated above, the pattern detector means 12 recognizes the three bit input patterns of 011 and 110 and produces in response thereto output pulses indicative of the binary input pattern recognized. The output pulses produced by said pattern detector means 12 are applied to the input of the shift pulse generator means 14 which, as previously stated above, produces a first shift pulse upon receipt of an input pulse indicative of a 110-bit input pattern and a second shift pulse upon receipt of an input pulse indicative of a 011-bit input pattern. The output of the shift pulse generator means 14 is applied through the conductor 22 to the second input of the voltage controlled oscillator means 4 which controls the stable phase of the clock pulses produced thereby. Thus, as was stated above, as a first shift pulse applied to the conductor 22 will cause a $2\pi/3$ shift in the phase of the output of the voltage-controlled oscillator means 4 and the stable phase of oscillation of the voltage controlled oscillator means 4 controls which of the low-speed pulse trains $CH_1$—$CH_3$ are passed through the channel gates $CG_1$—$G_3$, as aforesaid; it will be seen that such first shift pulse will cause a one bit shift in the cyclic permulation of the frame-synchronizing pulses applied to the first inputs of the channel comparator means $C_1$—$C_3$ so that a synchronized state is achieved in the embodiment of this invention illustrated in FIG. 2 and thereafter, said pattern detector means 12 will receive an all 1-bit input pattern. Similarly, the second shift pulse applied to the second input of the voltage controlled oscillator means 4 as aforesaid, will cause a $-2\pi/3$ shift in the phase of the clock pulses produced thereby so that a 2-bit shift in the cyclic permutation of the frame-synchronizing pulses applied to the first inputs of the channel comparator means $C_1$—$C_3$ will occur whereby the demultiplexing apparatus according to this invention is again placed in a synchronized state.

Thus, it will be seen that the embodiment of the demultiplexing apparatus according to the present invention acts to demultiplex a high speed pulse train M, comprising a plurality of multiplexed low speed pulse trains including frame-synchronizing pulses, without relation to their time assignment within said high speed pulse train by logically operating solely upon said low-speed pulse trains and achieving a synchronized state by the relative time difference between each of the frame-synchronizing signals included in said plurality of low-speed pulse trains. Accordingly, the demultiplexing apparatus according to the present invention does not require the logic operations of a frame-synchronizing feed back loop capable of operating at the speed of the high-speed pulse train and, as will be apparent to those of ordinary skill in the art, the frame-synchronizing signals present in the plurality of low-speed pulse trains may be relied upon to accomplish the demultiplexing of each of said plurality of low-speed pulse trains.

Although the present invention has been disclosed in conjunction with a specifically described exemplary embodiment, as will be obvious to those of ordinary skill in the art, many modifications and variations thereof are available which in no ways change the basic concepts of the instant invention. For instance, the demultiplexing apparatus according to the present invention may be used in conjunction with any high-speed pulse train formed of $n$ low-speed pulse trains where $n$ comprises any number which is equal to or greater than two (2). Furthermore, the low-speed pulse trains may be commonly controlled by counter means such as counter means 6 illustrated in FIG. 2, and in addition, the same operation as described above may be obtained without the use of a voltage controlled oscillator means by shifting the phase through a shift pulse generator means, such as shift pulse generator means 14, by the utilization of a ternary counter means which acts to count a timing wave synchronized with the pulse repetition frequency of the high-speed pulse train.

While the invention has been described in connection with an exemplary embodiment thereof, it will be understood that many modifications will be readily apparent to those of ordinary skill in the art; and that this application is intended to cover any adaptations or variations thereof.

We claim:

1. Demultiplexing apparatus for demultiplexing a time division multiplexed high-speed pulse train formed of a plurality of multiplexed low-speed pulse trains and including at least one frame-synchronizing signal therein, said demultiplexing apparatus comprising:

a plurality of demultiplexing gate means adapted to receive said high-speed pulse train and distribute said plurality of low-speed pulse trains therefrom;

means for receiving said high-speed pulse train and applying said high-speed pulse train to each of said plurality of demultiplexing gate means;

means connected to each of said plurality of demultiplexing gate means for periodically enabling all of said plurality of demultiplexing gate mean;

a plurality of comparator means for comparing a frame synchronizing signal with a frame-synchronizing pattern and providing an output signal indicative of the state of comparison therebetween, said plurality of comparator means being connected to respective ones of said plurality of demultiplexing gate means in a manner to receive respectively a low-speed pulse train therefrom;

counter means for generating said frame-synchronizing pattern, said counter means being connected to each of said plurality of comparator means, said counter means being adapted to be synchronized in time with one of said low-speed pulse trains so as to generate said frame synchronizing pattern at the same time as a frame-synchronizing signal is applied to one of said plurality of comparator means;

synchronization monitor means for establishing a state of synchronization between said frame-synchronizing signals and said frame-synchronizing pattern at said one of said plurality of comparator means, said synchronization monitor means being operatively connected between an output of said one of said plurality of comparator means and an input to said counter means; and means for detecting the cyclic permutation of said plurality of low-speed pulse trains distributed by said plurality of demultiplexing gate means and for changing, when necessary, the cyclic permutation detected to a desired cyclic permutation so that synchronization of said demultiplexing apparatus is achieved, said means for detecting and changing said cyclic permutation being electrically interposed between each of said plurality of comparator means and said means for periodically enabling all of said demultiplexing gate means.

2. The demultiplexing apparatus according to claim 1 wherein each of said plurality of low-speed pulse trains includes a frame-synchronizing signal present in a corresponding time slot therein.

3. The demultiplexing apparatus according to claim 2 wherein said means for detecting and changing said cyclic permutation comprises:

a plurality of channel synchronization monitor means for confirming the presence of a frame-synchronizing signal in time coincidence with said frame-synchronizing pattern at each of said plurality of comparator means, said plurality of channel synchronization monitor means being connected to respective ones of said plurality of comparator means;

pattern detector means for detecting the cyclic permutation of said plurality of low-speed pulse trains distributed by said plurality of demultiplexing gate means and generating signals indicative of the shift pulse required to change, when necessary, the cyclic permutation detected to said desired cyclic permutation, said pattern detector means being operably connected to each of said plurality of channel synchronization monitor means at the output thereof; and shift pulse generator means responsive to signals generated by said pattern detector means for generating the shift pulses indicated thereby, said shift pulse generator means being electrically interposed between said pattern detector means and said means for periodically enabling all of said demultiplexing gate means.

4. The demultiplexing apparatus according to claim 3 wherein said means for periodically enabling all of said demultiplexing gate means includes voltage-controlled oscillator means which acts to generate clock pulses having a repetition rate equal to the repetition rate of said plurality of low-speed pulse trains.

5. The demultiplexing apparatus according to claim 4 wherein each of said plurality of channel synchronization monitor means acts to generate a first information bit upon receipt of an output signal indicating the frame synchronization of the comparator means associated therewith and a second information bit when a nonsynchronized condition is indicated; said pattern detector means determining the cyclic permutation of said plurality of low-speed pulse trains distributed by said plurality of demultiplexing gate means from the first and second information bits applied thereto.

6. The demultiplexing apparatus according to claim 5 additionally comprising means for phasing the clock pulses generated by said voltage-controlled oscillator means with said high-speed pulse train, said voltage-controlled oscillator means thereby having one phase of stable oscillation for each of said plurality of low-speed pulse trains included in said high-speed pulse train.

7. The demultiplexing apparatus according to claim 6 wherein said shift pulses act to change the phase of oscillation of said voltage-controlled oscillator means from one stable phase to another.

8. The demultiplexing apparatus according to claim 7 wherein said plurality of demultiplexing gate means, said plurality of comparator means, said plurality of channel-synchronizing means and said plurality of low-speed pulse trains are each equal in number.

9. The demultiplexing apparatus according to claim 8 wherein said mean for receiving said high-speed pulse train and applying said high-speed pulse train to each of said plurality of demultiplexing gate means includes input means in series with each of said plurality of demultiplexing gate means and delay means interposed between each adjacent pair of said plurality of demultiplexing gate means, said delay means being adapted to insert a one bit delay into signals passing therethrough.

PO-1050
(5/69)

UNITED STATES PATENT OFFICE
CERTIFICATE OF CORRECTION

Patent No. 3,571,516 Dated March 16, 1971

Inventor(s) Chishio OHYAMA et al

It is certified that error appears in the above-identified patent and that said Letters Patent are hereby corrected as shown below:

Column 2, line 66, "take egorm" should be --take the form--.

Column 3, line 59, "CH1-$CH_3$" should be --$CH_1$-$CH_3$--;

line 62, "G1-$G_3$" should be --$G_1$-$G_3$--;

line 69, "G1-$G_3$" should be --$G_1$-$G_3$--.

Column 4, line 75, "$S_4$)" should be --$S_4$.--.

Column 5, line 16, "$34_1$-3" should be --$34_1$-$34_3$--;

line 17, "1" and "0" should be in quotation marks;

line 41, "-2π/3" should be --2π/3--.

Column 6, line 65, "G1-$G_3$" should be --$G_1$-$G_3$--, and after same insert --will act to appropriately time said channel gate means $G_1$-$G_3$--;

line 69, "$0_1$-$O_3$," should be --$O_1$-$O_3$,--.

Column 7, line 6, after "distribution" delete "1-$CH_t$ime" and insert --of time-- therefor;

line 7, after "high-speed" delete "i-d" and insert --pulse line 9, "$0_1$-$O_3$" should be --$O_1$-$O_3$--;

PO-1050
(5/69)

UNITED STATES PATENT OFFICE
CERTIFICATE OF CORRECTION

Patent No. 3,571,516 Dated March 16, 1971

Inventor(s) Chishio OHYAMA et al

It is certified that error appears in the above-identified patent and that said Letters Patent are hereby corrected as shown below:

Column 7, line 28, "$CH_1$-$CH_3$)" should be --$CH_1$-$CH_3$.--.

Column 9, line 2, "1" should be in quotation marks;

line 4, "0" should be in quotation marks;

lines 12 and 26, "1" should be in quotation marks;

line 64, "comprises" should be --comprised--.

Column 10, line 10, "CH1-$CH_3$" should be --$CH_1$-$CH_3$--;

lines 19 and 51, "1" should be in quotation marks;

line 44, C$G_1$-$G_3$" should be --$G_1$-$G_3$--;

Signed and sealed this 14th day of September 1971.

(SEAL)
Attest:

EDWARD M.FLETCHER, JR.
Attesting Officer

ROBERT GOTTSCHALK
Acting Commissioner of Pa